United States Patent [19]
Dua

[11] Patent Number: 6,073,898
[45] Date of Patent: Jun. 13, 2000

[54] LAMP MOUNTING SYSTEM AND METHOD OF MANUFACTURING

[75] Inventor: Karan Dua, Madison, Ind.

[73] Assignee: Grote Industries, Inc., Madison, Ind.

[21] Appl. No.: 09/025,936

[22] Filed: Feb. 19, 1998

[51] Int. Cl.[7] .................................................. E04G 3/00
[52] U.S. Cl. ............................... 248/292.14; 248/291.1; 362/287
[58] Field of Search .......................... 248/288.51, 291.1, 248/479, 480, 279.1, 286.1, 292.14, 181.1, 181.2; 362/287, 289, 322, 324, 427, 428

[56] References Cited

U.S. PATENT DOCUMENTS

| | | | |
|---|---|---|---|
| 4,485,430 | 11/1984 | Achiags Fustel | 362/267 |
| 4,565,345 | 1/1986 | Templeman | 248/481 |
| 4,667,995 | 5/1987 | Wilkins | 293/117 |
| 4,791,535 | 12/1988 | Sclafani et al. | 362/82 |
| 4,955,577 | 9/1990 | Ching | 248/539 |
| 5,146,392 | 9/1992 | Kasboske | 362/61 |
| 5,335,159 | 8/1994 | Chen et al. | 362/421 |
| 5,611,510 | 3/1997 | Yamamoto | 248/205.3 |
| 5,788,518 | 8/1998 | Wachter | 439/121 |

*Primary Examiner*—Ramon O. Ramirez
*Assistant Examiner*—Gwendolyn Baxter
*Attorney, Agent, or Firm*—Woodard, Emhardt, Naughton, Moriarty & McNett Patent and Trademark Attorneys

[57] ABSTRACT

An adjustable lamp mounting system consisting of a lamp housing, a mounting bracket and a mounting stud having an enlarged head and a guiding portion adjacent the enlarged head. The enlarged head of the mounting stud is configured to substantially correspond to the height of the interior chamber created between the mounting bracket and lamp housing, thereby maintaining the mounting stud guiding portion within a mounting bracket slot.

14 Claims, 3 Drawing Sheets

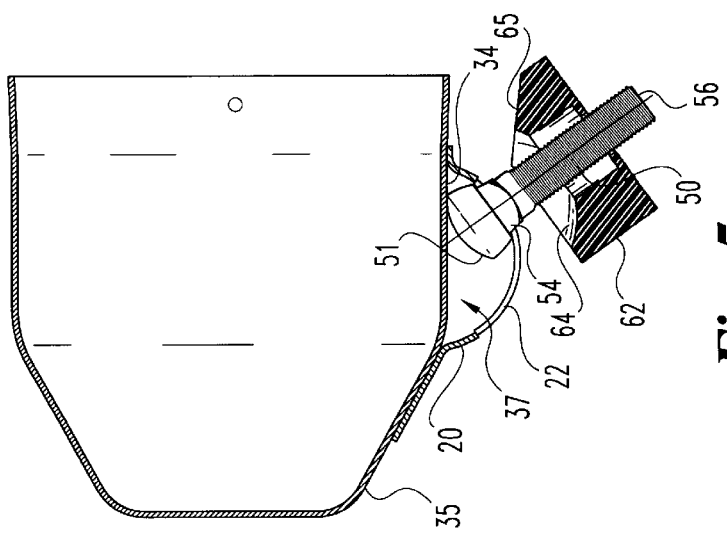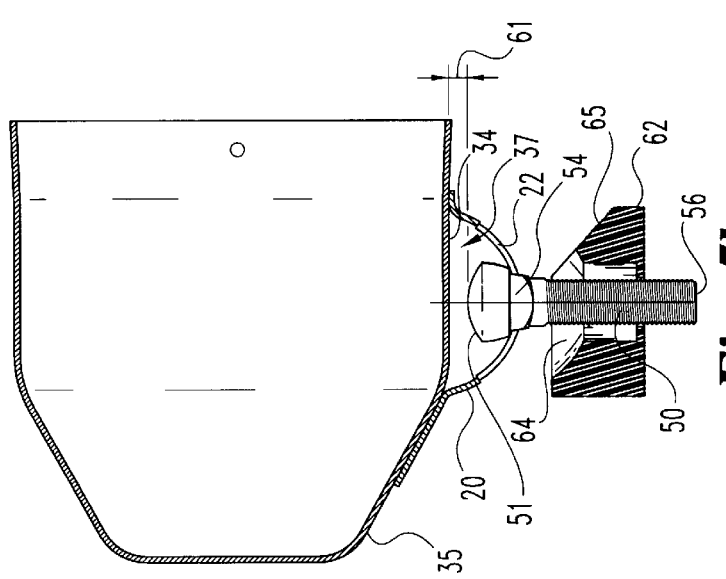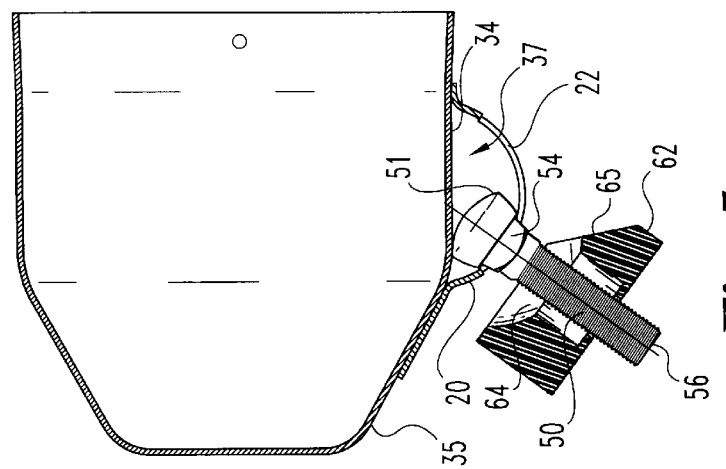

LAMP MOUNTING SYSTEM AND METHOD OF MANUFACTURING

BACKGROUND OF THE INVENTION

This invention relates generally to lamp mounting systems and more particularly, to adjustable lamp mounting systems for vehicles.

Headlamps for moving vehicles generally consist of a housing which contains an illumination source and a lens or substantially transparent covering protecting the illumination source. Particularly with respect to add-on lighting elements, the headlamp housing must be mounted to the vehicle through a mounting system that provides some adjustability of the lamp with respect to the mounting surface on the vehicle. FIGS. 1a–1c show a prior art system of providing a headlamp housing with an adjustable mounting member. Specifically, lamp housing 35 includes a mounting bracket 20 affixed to the lamp housing adjacent mounting area 34. Mounting bracket 20 is affixed to the lamp housing 35 by fixation members extending through apertures 24a, 24b, and 24c. Typically, such fixation members are rivets. A mounting stud 12 is disposed within mounting bracket slot 22 and includes an enlarged head 14, an intermediate portion 16 defining a guiding surface and a threaded shaft 18. The enlarged head 14 is sized to engage concave bearing surface 26 of the mounting bracket 20. The intermediate portion 16 is substantially square and has sufficient size to prevent rotation of the mounting stud 12 within slot 22, whereby adjustment of the lamp housing 35 relative to a mounting surface of a vehicle is limited to rotation about a single axis.

To maintain mounting stud 12 within slot 22, a cup washer 28 having an aperture 30 corresponding to the guiding surface of intermediate portion 16 of stud 12 is placed with the aperture 30 adjacent the intermediate portion 16. With enlarged head 14 engaging bearing surface 26, the intermediate portion 16 is deformed to create a retaining lip 32 (FIG. 1c). The combination of the enlarged head 14 and retaining lip 32 maintains the guiding surface of intermediate portion 16 within slot 22. The mechanical deformation of the intermediate portion 16 adjacent the cup washer 28 to form retaining lip 32 is commonly referred to as "staking" the mounting stud 12 within the mounting bracket 20.

As shown in FIG. 1c, the distance 36 between the lamp housing mounting area 34 and head 14 is greater than the height 38 of intermediate portion 16. Thus, without retaining lip 32 or tension applied to mounting stud 12 by a nut (not shown), the intermediate portion 16 may disengage slot 22 and allow rotation of the lamp housing 35 about the mounting stud longitudinal axis. After completion of the mechanical attachment of the mounting stud 12, the mounting bracket 20 may then be attached to the lamp housing 35.

While the foregoing prior art lamp mounting technique has been well received, there remains a need for a lamp mounting assembly which provides the desired adjustability feature, yet is less complicated to manufacture. For example, it would be preferable from a manufacturing standpoint to fabricate a lamp assembly which does not include the lamp mounting step of staking the mounting bolt within the mounting bracket.

SUMMARY OF THE INVENTION

The present invention provides a lamp mounting system. The system may be comprised of a lamp housing, a mounting bracket and a mounting stud. The mounting stud has a first enlarged end, a second opposite other end, and an intermediate guide portion. The enlarged end has a first height and the intermediate portion has a second height. The mounting bracket includes an upper mounting portion and a lower bearing surface, the lower bearing surface defining an opening sized to receive the intermediate guide portion and prevent passage of the first enlarged end. The upper mounting portion is secured to the lamp housing to define an interior chamber between the lower bearing surface and the lamp housing. The interior chamber is sized to receive the enlarged end and has a third height. The difference between the third height and the first height is less than the second height, whereby the enlarged end engages the lower bearing surface and the lamp housing to maintain the intermediate guide portion within the opening in the mounting bracket.

This invention also contemplates a method for manufacturing a lamp mounting assembly. The method comprises the steps of providing a lamp housing, a mounting bracket having a mounting portion and a concave bearing surface having a maximum height and a slot defined therein, and a fastener having a first enlarged end, an opposite second end and a guide surface disposed therebetween. The first enlarged end is sized to engage the bearing surface and lamp housing to maintain the guide surface within the slot. The fastener is inserted into the mounting bracket slot with the guide surface disposed within the slot and the enlarged end positioned adjacent the bearing surface. To complete the assembly, the mounting portion of the mounting bracket is interconnected with the lamp housing to capture the enlarged head between the bearing surface and the lamp housing, thereby maintaining the guide portion within the slot.

One object of the present invention is to provide an improved mounting stud for use with a lamp mounting assembly.

Another object of the present invention is to provide a mounting bracket and cooperable mounting stud for convenient and efficient mounting on a lamp housing.

Still a further object of the present invention is to provide a quick and cost effective method for interconnecting a lamp housing, mounting bracket and mounting stud.

Other objects and advantages of the present invention will be apparent from the following description.

BRIEF DESCRIPTION OF THE DRAWINGS

FIGS. 1 through 1c illustrate a prior art adjustable mounting stud assembly and lamp housing.

FIGS. 5a through 5c show the mounting stud of FIG. 3 in engagement with the lamp housing and mounting bracket of FIG. 2.

DESCRIPTION OF THE PREFERRED EMBODIMENT

Figures 1A, 1B, 1C:
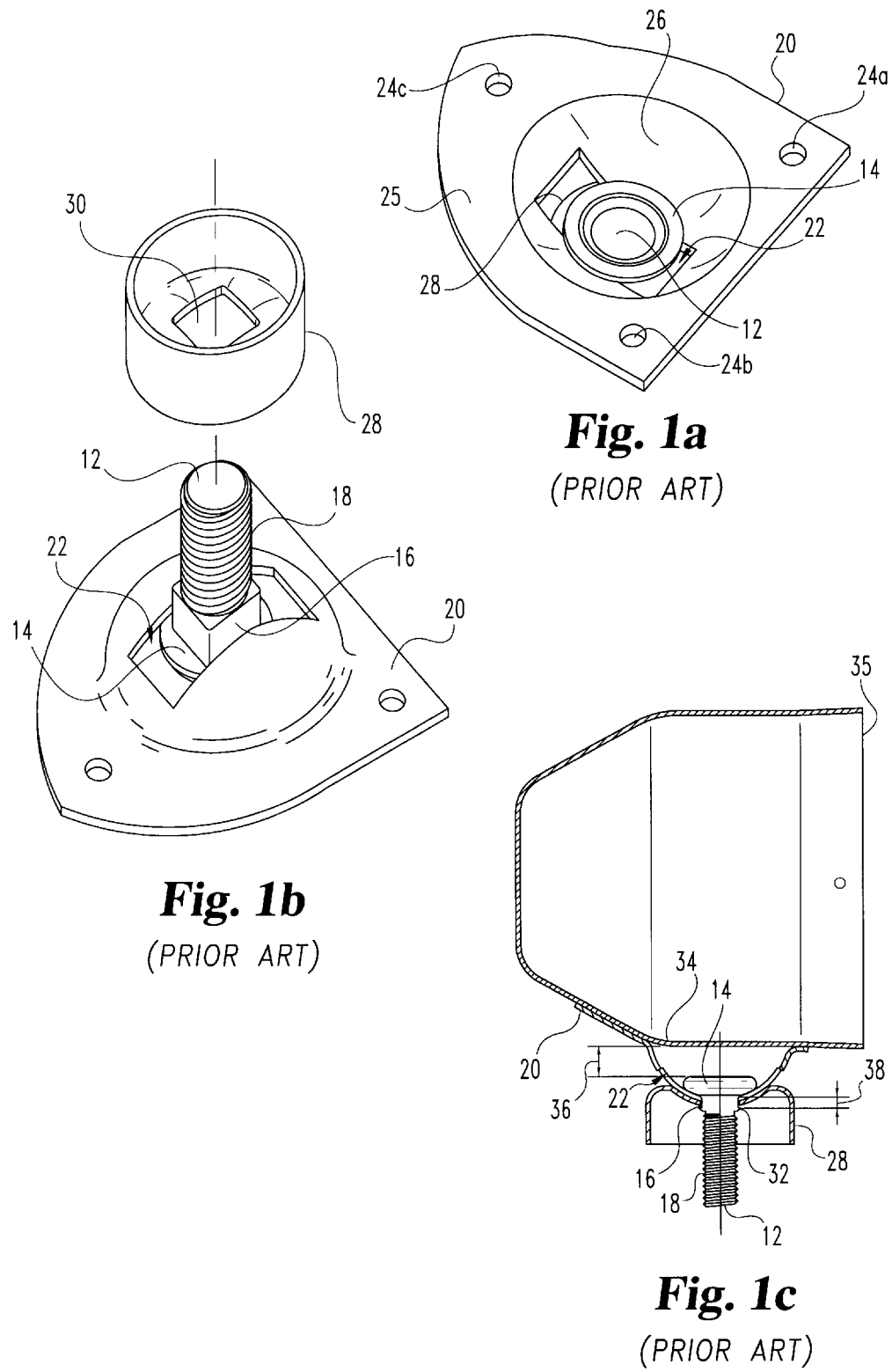

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
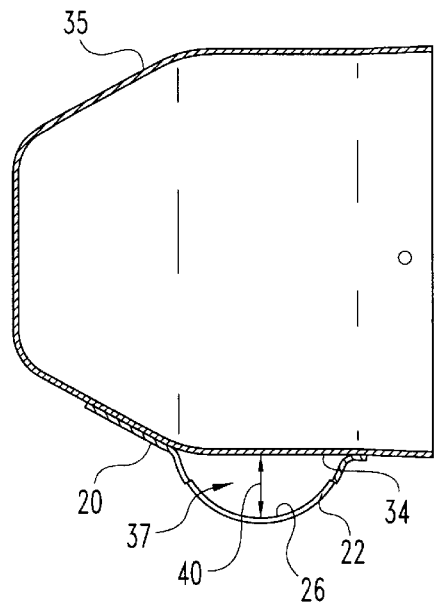
FIG. 2 shows the prior art lamp housing of FIG. 1c interconnected with the prior art mounting bracket of FIGS. 1a–1c.

The present invention provides a convenient apparatus and method for fixing an adjustable mounting stud to a lamp housing. FIG. 2 shows the prior art lamp housing 35 of FIG. 1c having the prior art mounting bracket 20 of FIGS. 1a–1c mounted thereto adjacent lamp housing mounting area 34. Mounting bracket 20 includes an adjustment slot 22 and a concave bearing surface 26. Mounting bracket 20 and lamp housing 35 define an interior chamber 37 having a maximum height 40 between bearing surface 26 and mounting area 34.

Figure 3:
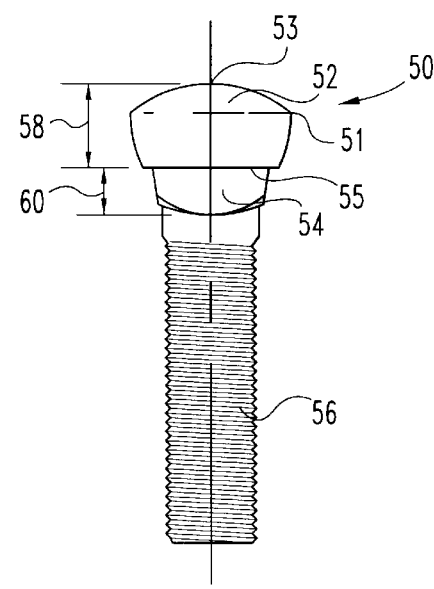
FIG. 3 shows a mounting stud according to the present invention.
Figure 4:
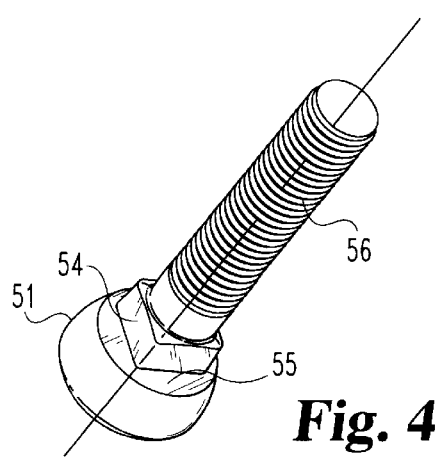
FIG. 4 shows a perspective view of the mounting stud of FIG. 3.

Referring now to FIG. 3, a mounting stud 50 according to the present invention is shown. Mounting stud 50 includes an enlarged head 51 having a crowned top 52 and an apex 53. Opposite enlarged head 51 is threaded portion 56. Disposed between enlarged head 51 and threaded portion 56 is guiding portion 54. Guiding portion 54 is preferably a substantially square shape having four planar surfaces, although guiding portion 54 may alternatively be configured in a rectangular or other shape having at least two opposing planar surfaces. Moreover, although guiding portion 54 is shown having planar surfaces, it is contemplated that guiding portion 54 could be formed in any shape that allows performance of the necessary guiding function. Referring now to FIG. 4, disposed between enlarged head 51 and guiding portion 54 is a bearing surface 55 for engaging a corresponding bearing surface 26 of the mounting bracket 20.

Enlarged head 51 has a height 58 extending between apex 53 and bearing surface 55. Preferably, height 58 is less than height 40 between the mounting bracket 20 and the lamp housing 35. The height 58 may be modified depending on the configuration of the lamp housing 35 and mounting bracket 20. Guiding surface 54 has a height 60 that is greater than the difference between height 40 and 58. Thus, when disposed within mounting bracket 20, enlarged head 51 maintains guiding portion 54 within slot 22.

Referring now to FIG. 5, which is composed of FIGS. 5a–5c, mounting stud 50 is shown positioned within slot 22 of mounting bracket 20. Enlarged head 51 is captured within interior chamber 37. Threaded portion 56 extends beyond the mounting bracket 20 and guiding portion 54 is disposed adjacent slot 22. Mounting bracket 20 is interconnected with lamp housing 35 adjacent lamp mounting area 34. Once interconnected, bearing surface 55 of the mounting stud engages and slides along bearing surface 26 (FIGS. 1 and 2) of mounting bracket 20. As previously described, enlarged head 51 is sized to maintain guiding portion 54 within slot 22 throughout angular movement of the mounting stud 50 within the slot 22. Engagement between crown 52 (FIG. 3) and mounting surface 34 (FIGS. 5a and 5c) prevents movement of the entire guiding surface 54 into the interior chamber 37 so that guiding surface 54 does not disengage slot 22. Crown surface 52 provides single point contact with mounting surface 34 and increases the maximum angular distance the mounting stud 50 may move in comparison to a similarly sized head 51 having a substantially planar upper surface. As shown in FIG. 5b, there is a space between enlarged head 51 and mounting surface 34 having a height 61. However, height 61 is less than height 60 of guiding surface 54 so that enlarged head 51 will engage mounting surface 34 before guide surface 54 disengages slot 22.

Once mounting stud 50 has been secured within mounting bracket 20 and mounting bracket 20 has been affixed to lamp housing 35, a molded plastic swivel washer 62 may then be disposed about threaded portion 56. Swivel washer 62 includes a concave area 64 substantially matching the concavity of mounting bracket 20 and an inclined surface 65 extending over a portion of the outer surface. Typically, swivel washer 62 is placed between mounting bracket 20 and the mounting surface of a vehicle (not shown). An internally threaded nut (not shown) engages threaded portion 56 to securely affix mounting stud 50 to the vehicle and thereby, maintain the desired position of lamp housing 35 relative to the mounting surface of the vehicle. It will be understood that the angular position of lamp housing 35 may be adjusted when tension on mounting stud 50 is reduced. Similarly, the angular position of lamp housing 35 may be maintained in a desired position by further increasing tension on mounting stud 50 to compress lower bearing surface 26 (FIG. 2) between bearing surface 55 (FIG. 4) and swivel washer 62.

The present invention is manufactured in the following manner. Mounting stud 50, mounting bracket 20 and lamp housing 35 are initially provided. Mounting stud 50 is placed within slot 22 of the mounting bracket 20 with bearing surface 55 in engagement with bearing surface 26 of the mounting bracket 20. As shown in FIG. 5, threaded end 56 is passed through slot 22. Mounting bracket 20 is then affixed to lamp housing 35 adjacent lamp mounting portion 34, thereby capturing enlarged head 51 within interior chamber 37.

As shown in FIGS. 5a–c, the configuration of enlarged head 51 of mounting stud 50 eliminates the manufacturing step of staking the mounting bolt to a swivel washer to maintain the guiding portion 54 within the mounting bracket slot 22. Specifically, enlarged head 51 is sized to alternatively engage lamp mounting portion 34 or lower bearing surface 26 before guiding portion 54 moves out of slot 22 in mounting bracket 20. Thus, the present invention provides a time saving manufacturing process over the prior art. Specifically, the prior art requires that the mounting bracket and mounting stud be mechanically interconnected and then that the mounting bracket be attached to the lamp housing. In contrast, utilization of the mounting stud of the present invention allows the mounting stud 50 to be securely held in the mounting bracket 20 in the proper position by simply connecting the mounting bracket 20 to the lamp housing 35.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A lamp mounting system, comprising:

a lamp housing;

a mounting stud having a first enlarged end, a second opposite other end, and an intermediate guiding portion, said enlarged end having a first height and said intermediate guiding portion having a second height; and a mounting bracket having an upper mounting portion and a lower bearing surface, said lower bearing surface defining an opening sized to receive said intermediate guiding portion and to prevent passage of said first enlarged end, said upper mounting portion secured to said lamp housing to define an interior chamber between said lower bearing surface and said lamp housing, said interior chamber sized to receive said enlarged end and having a third height;

wherein the difference between said third height and said first height is less than said second height, whereby said enlarged end engages said lower bearing surface and said lamp housing to maintain said intermediate guiding portion within said opening.

2. The apparatus of claim 1, wherein said lower bearing surface is concave and said lamp housing is substantially planar adjacent said mounting bracket.

3. The apparatus of claim 2, wherein said opening is a slot and said intermediate guiding portion is movable within said slot.

4. The apparatus of claim 3, wherein said opening is a rectangular slot with a length and a width and wherein said intermediate guiding portion includes opposing planar surfaces spaced to substantially correspond to the width of said slot.

5. The apparatus of claim 4, wherein said intermediate guiding portion is substantially square.

6. A lamp mounting system, comprising:

a lamp housing;

a mounted stud having a first enlarged end, a second opposite other end, and an intermediate guiding portion, wherein said enlarged end includes a substantially convex upper surface, said upper surface including an apex substantially opposite said second end, and wherein said enlarged end having a first height and said intermediate guiding portion having a second height; and a mounting bracket having an upper mounting portion and a lower bearing surface, said lower bearing surface defining an opening sized to receive said intermediate guiding portion and to prevent passage of said first enlarged end, said upper mounting portion secured to said lamp housing to define an interior chamber between said lower bearing surface and said lamp housing, said interior chamber sized to receive said enlarged end and having a third height;

wherein the difference between said third height and said first height is less than said second height, whereby said enlarged end engages said lower bearing surface and said lamp housing to maintains said intermediate guiding portion within said opening.

7. The apparatus of claim 6, wherein said lamp housing is substantially planar such that engagement between said enlarged end occurs along said convex upper surface.

8. The apparatus of claim 6, wherein said lower bearing surface is concave and said lamp housing is substantially planar adjacent said mounting bracket.

9. The apparatus of claim 8, wherein said opening is a slot and said intermediate guiding portion is movable within said slot.

10. The apparatus of claim 9, wherein said opening is a rectangular slot with a length and a width and wherein said intermediate guiding portion includes opposing planar surfaces spaced to substantially correspond to the width of said slot.

11. The apparatus of claim 10, wherein said intermediate guiding portion is substantially square.

12. A lamp mounting assembly, comprising:

a lamp housing;

a mounting bracket having a slot, said mounting bracket attached to said lamp housing;

a fastener having a first end, an opposite second end and a guiding portion disposed between said first end and said second end, said fastener moveably positioned within said slot with said guiding portion disposed within said slot; and means disposed on said first end for engaging said lamp housing and said mounting bracket to maintain said guiding portion within said slot.

13. The apparatus of claim 8 wherein said mounting bracket includes a concave bearing surface adjacent said slot and said means engages said bearing surface.

14. A method for manufacturing a lamp mounting assembly, comprising:

providing a lamp housing, a mounting bracket having a mounting portion and a concave bearing surface having a maximum height and a slot defined therein, and a fastener having a first enlarged end, an opposite second end and a guiding portion disposed therebetween, said first enlarged end sized to engage the bearing surface and lamp housing to maintain the guiding portion within the slot;

inserting the fastener into the mounting bracket slot with the guiding portion disposed within the slot and the enlarged end positioned adjacent said bearing surface; and interconnecting the mounting portion to the lamp housing to capture the enlarged head between the bearing surface and the lamp housing, thereby maintaining the guiding portion within the slot.

* * * * *